United States Patent [19]

Guerra et al.

[11] Patent Number: 4,892,700
[45] Date of Patent: Jan. 9, 1990

[54] PROCESS FOR MAKING MULTILAYERED, FORMABLE LAMINATES

[75] Inventors: Carlos Guerra, Fairfield; John Lee, Norwalk; Mark Johnson, Bridgeport, all of Conn.

[73] Assignee: Polycast Technology Corporation, Stamford, Conn.

[21] Appl. No.: 106,191

[22] Filed: Oct. 7, 1987

[51] Int. Cl.⁴ ............ B29C 47/06; B29C 51/02; B29C 51/10; B29C 51/14

[52] U.S. Cl. .................. 264/510; 264/102; 264/171; 264/216; 264/236; 264/245; 264/554

[58] Field of Search ........... 264/102, 171, 216, 236, 264/245, 246, 247, 250, 255, 331.18, 510, 553, 554, 571

[56] References Cited

U.S. PATENT DOCUMENTS

| | | | |
|---|---|---|---|
| 2,997,745 | 8/1961 | Kroeker | 264/255 X |
| 3,663,493 | 5/1972 | Miller | 264/216 X |
| 3,949,044 | 4/1976 | Varini | 264/245 |
| 3,978,178 | 8/1976 | Oshima et al. | 264/236 X |
| 4,041,120 | 8/1977 | Oshima et al. | 264/171 |
| 4,100,237 | 7/1978 | Wiley | 264/40.6 |
| 4,107,251 | 8/1978 | Bollen et al. | 264/171 |
| 4,221,836 | 9/1980 | Rutledge et al. | 428/220 |
| 4,254,074 | 3/1981 | Toyooka et al. | 264/132 |
| 4,302,497 | 11/1981 | Toyooka et al. | 428/203 |
| 4,338,269 | 7/1982 | Russell | 264/236 X |
| 4,339,400 | 7/1982 | Sorko-Ram | 264/510 X |
| 4,405,551 | 9/1983 | Barnard et al. | 264/245 |
| 4,415,509 | 11/1983 | Toyooka et al. | 264/1.3 |
| 4,415,519 | 11/1983 | Strassel | 264/171 |
| 4,619,802 | 10/1986 | Cloeren | 264/171 |
| 4,671,913 | 6/1987 | Gen et al. | 264/171 |

FOREIGN PATENT DOCUMENTS

| | | | |
|---|---|---|---|
| 50-3342 | 2/1975 | Japan | 264/216 |
| 56-150515 | 11/1981 | Japan | 264/171 |
| 59-115843 | 7/1984 | Japan | 264/171 |
| 889486 | 2/1962 | United Kingdom | 264/216 |

Primary Examiner—Jeffery Thurlow
Assistant Examiner—Leo B. Tentoni
Attorney, Agent, or Firm—Pennie & Edmonds

[57] ABSTRACT

A process for making a multilayered formable plastic composite laminate and a process for its manufacture which includes preparing an acrylic composition which includes the reaction product of a mixture of predominantly an acrylic monomer and a substantially lesser amount of a polymer thereof, at least one free radical reaction initiating reaction catalyst, and optionally, a chain length regulating agent or a cross-linking agent; deaerating the acrylic composition; casting the deaerated acrylic composition upon a sheet or laminate of a thermoplastic material; and curing the cast acrylic composition in several successive stages so as to substantially polymerize the acrylic monomer and to permit penetration of the acrylic composition preferably to a depth of between about 0.001-0.1 inch into thermoplastic material to form a laminate having a uniform and gradual acrylic/thermoplastic interphase, rather than a sharp separation between the layers thereof, so as to prevent delamination during further processing operations. These laminates are then thermoformed into various shaped articles.

31 Claims, No Drawings

PROCESS FOR MAKING MULTILAYERED, FORMABLE LAMINATES

FIELD OF THE INVENTION

The invention relates to a process for producing plastic composite laminates and more particularly to multilayered formable rigid composite articles produced by casting an acrylic layer onto another thermoplastic which serves as a substrate.

BACKGROUND OF THE INVENTION

Multilayered thermoplastic laminates formed of ABS, polyvinyl chloride, acrylics, polycarbonates, alloys or mixtures thereof have previously been produced by extruding or calendering these materials into thin sheets which are then stacked and subsequently bonded by a process such as fusion bonding, carried out at an elevated temperature.

One method which has been employed to produce extruded products of the type described above is set forth in U.S. Pat. No. 4,107,251 to Bollen et al. The technique disclosed therein comprises extruding a blend of a polycarbonate polymer, a polyethylene terephthalate and a non-acidic silica filler onto a moving support, such as a casting roll, to form an essentially non-oriented sheet. The sheet may then be collected and thermoformed into a variety of useful shapes. Although these products may be quickly formed and inexpensively produced, they suffer, however, from poor abrasion resistance, poor weatherability and dull finishes caused due to their soft, irregular surfaces.

In a further effort to overcome the disadvantages discussed above, attempts have been made, for example, to co-extrude an acrylic layer over a number of different thermoplastic substrates. Such a process is described in U.S. Pat. No. 4,100,237 to Wiley, wherein a molten stream of ABS is joined to a corresponding stream of polystyrene within a single extruder discharge conduit such that a single laminated stream is produced, having a well-defined interface between the adjoining layers. The combined streams are subsequently passed through a sheet form extrusion die having lips generally aligned with the interface.

In some instances, however, the final (co-extruded) product must be produced from normally incompatible polymers. A number of methods have been utilized by those working in the field to overcome this incompatibility, such as that disclosed in U.S. Pat. No. 4,221,836 to Rutledge et al. This patent relates to a process for forming a composite plastic sheet of a solid hydrocarbon polymer and an ABS polymer which comprises co-extruding the two polymers with an intermediate layer interposed therebetween. This intermediate layer comprises an ABS polymer having a bonding factor and a melt viscosity between that of the surrounding layers. These attributes render the intermediate layer strongly adherent to each adjoining polymer layer.

The above-described lamination process developed by Rutledge et al. suffers, however, from several disadvantages. These include the possible delamination of the finished product during the forming process or upon exposure to water when the finished parts are in service. Further, the resultant products suffer from poor weatherability, as well as poor surface quality due to the appearance of die lines and blisters. Additionally, the products must normally be manufactured in a limited variety of colors due to the effort and expense involved in starting and changing the color of materials utilized in a continuous extrusion production line. Also, the material costs required to carry out this process are high because manufacturers cannot re-process scrap material by reentering it into the production line. These materials must thus be discarded as non-recoverable waste.

Various methods for creating an integrated layer structure have also been advanced in the prior art. One such method is described in U.S. Pat. Nos. 4,254,074 and 4,302,497 to Toyooka et al., directed to a process for the production of a decorated synthetic sheet and to the sheet thus produced. The product is formed of a continuously cast sheet of a polymerized synthetic resin syrup which is integrally joined upon at least one side with a uniformly thick preformed film of polymerized synthetic resin, compatible with the cast syrup. The film and the sheet are thus integrally joined to form a homogeneous product.

A different method is set forth in Toyooka's U.S. Pat. No. 4,415,509. This reference discloses a process for forming an integrated laminate of an acrylic resin film having a high light diffusing ability which incorporates an acrylic plate. The process comprises coating an acrylic resin film onto the molding surface of a casting mold, adding an acrylic monomer or a partially polymerized acrylic product into the mold and then polymerizing the product thus produced. The film thus becomes integrated with and laminated upon the surface of the acrylic resin plate.

A coextrusion process for forming integrally joined laminates is disclosed in U.S. Pat. No. 4,415,519 to Strassel. This process involves the coextrusion of: (1) a polyvinylidene fluoride resin layer, (2) a polyalkyl methacrylate layer and (3) a thermoplastic resin, wherein molten streams of these resins are brought into contact some distance prior to exiting the extrusion apparatus so as to optimize the cohesion among adjacent layers. In this manner, the interfaces between adjacent layers become "blended" together into a homogeneous structure, and are no longer easily separable from one another.

None of these processes have been completely successful, however, in overcoming the disadvantages noted above. Articles produced by these processes thus remain prone to delamination, i.e., separation of their layers, during subsequent forming steps or due to mechanical and/or environmental factors when the articles are used.

SUMMARY OF THE INVENTION

Applicants have now developed novel multilayered, formable, rigid plastic composite sheets comprising a layer of clear or colored acrylic material which is cast onto the surface of a substrate of another thermoplastic. These sheets form an integrally bonded laminate structure which may be readily formed by heat and pressure into shapes for use as sinks, bathtubs, furniture, hulls for small boats, appliance body parts, automotive body parts and the like.

The invention also relates to a process for preparing such laminates comprises preparing an acrylic composition, deaerating the composition; casting the composition onto at least a portion of one surface of at least one thermoplastic material, and curing the cast acrylic composition for a sufficient temperature and time to substantially polymerize the acrylic monomers of the composition in a manner which permits partial penetration of the acrylic composition into the thickness of the thermoplastic material to a sufficient depth to form a multi-layer, formable, cast composite laminate having increased resistance to debonding during subsequent handling, forming or other manufacturing operations. A preferred forming operation is vacuum thermoforming, such that the composite laminate can be produced into the above-mentioned shaped articles.

DETAILED DESCRIPTION OF THE PREFERRED EMBODIMENTS

The present invention relates to a process for producing laminates by casting an acrylic composition onto the surface of a substrate such as, for example, an extruded or calendered thermoplastic material, followed by curing the resultant laminate by polymerizing the acrylic monomer. The substrate may be formed of a homogeneous thermoplastic composition or it may comprise multiple layers of sheets of resins or polymers such as: ABS, PVC, ROVEL modified styrene/acrylonitrile copolymer and PMMA or mixtures thereof. Generally, the substrate will be a thermoplastic material other than an acrylic, but in certain instances the upper acrylic layer may be cast onto a modified acrylic substrate for use in various applications.

A preferred embodiment of the inventive method comprises the preparation of a "syrup" by a process well known in the art, containing a mixture of the acrylic monomer with a small proportion, preferably in the range of from about 5–20%, most preferably about 10%, of the corresponding polymer (these and all subsequent percentage values are given by weight). This mixture is known as a syrup since, by itself, the monomer possesses a thin, watery viscosity and easily leaks out through small seams in the molding apparatus used during the subsequent casting procedure. A variable percentage of the polymer is thus added in order to adjust the viscosity of the acrylic to a thicker, "syrupy" consistency, so as to prevent this acrylic mixture from escaping from the mold.

A number of additional ingredients may then be added together with the "syrup" in varying amounts, by processes well known in the art. One material which is preferably included, is at least one free-radical initiator compound which functions as a catalyst in order to initiate the polymerization of the acrylic monomer.

According to the well-known practice in the art, more than one such initiator compound may be used; one, such as di(sec-butyl) peroxydicarbonate, functioning best at the low end of the curing temperature scale, (described below), i.e., at around 50° C.; and a second initiator, such as benzoyl peroxide, which works best at higher temperatures, (such as at about 70° C. or above). The effect of using two such free radical initiator compounds is thus to ensure the smooth, complete polymerization of the acrylic monomer within the entire range of temperatures encountered during the curing operation.

The amount of initiator compound to be added to the mixture may vary between about 0.001–2% by weight, but the preferable range is between about 0.5–1.5%. If too small an amount of the catalyst is added, the polymerization reaction either will not occur at all or alternately, would proceed so slowly that the material would take an economically unfeasible length of time to cure. Conversely, however, if too great an amount of the initiator composition is added to the mixture, the acrylic product may cure too rapidly or may be ruined during a subsequent thermoforming step, such as by the production of bubbles or by a foaming reaction occurring within the sheet.

A cross-linking agent, such as ethylene glycol dimethacrylate may also be added to the mixture in an amount of between about 0.1–2% by weight, and preferably about 0.8–1.2%. The purpose of cross-linking the polymer layer in this instance is to provide a layer which has improved weatherability and which is harder, i.e., more resistent to both scratches and chemical attack which may mar or dull its surface. Further, the resultant cross-linked surface is also more resistant to abrasion by, for example, common household cleansers. Other compositions which may be utilized as cross-linking agents include, for example, allyl methacrylate, polyethylene glycol dimethacrylate, methacrylamide and others well known in the art.

The preferred process of the invention further comprises adding a chain length regulating composition to the product to control the length of the polymer chains. This regulating agent may be, for example, dodecylmercaptan or others known in the art. It may be added to the mixture in an amount of from about 0.001–2%. Further, the amount of chain length regulator used is directly related to the amount of the free radical reaction initiating catalyst which is introduced, since this material controls the formation of the polymer chains whose length is to be regulated. A preferred amount of the chain length regulating agent is from about 0.05–0.2% by weight.

Once the casting composition has been prepared, it should be deaerated, in order to prevent the formation of gas bubbles during the curing step. Thereafter, the deaerated composition may be utilized to fill a mold having a glass plate approximately 0.3–0.4 inches in thickness on the bottom and a suitable thermoplastic substrate, such as, for example, SAN, ABS, polyvinyl chloride, an acrylic, polycarbonate ABS/nylon alloys or other alloys or mixtures produced by extrusion or calendering of these materials, on the top. The four sides of the mold preferably support a resilient gasket in position along the peripheral edges thereof to hold the liquid acrylic composition between the top and bottom, sheets. The monomer is preferably cast in a thickness of 0.02–0.5 inches.

One of the advantages of the present invention is that, until now it has not been possible to produce a laminate having a cross-linked acrylic layer in conjunction with a substrate of an extruded thermoplastic. Applicants' novel casting technique thus now permits the production of such a laminate without the danger of separating or debonding during subsequent forming, handling or use.

In an alternate embodiment, since the acrylic monomer is prone to attacking the surface of a soft thermoplastic such as ABS, a composite formed of PVC or an acrylic polymer, laminated or coextruded upon ABS may initially be produced and utilized to prevent such attack. These samples may either be prepared, as described above in a cell, i.e., a batch-type, casting procedure made in the mold; or they may be produced with the use of a continuous casting technique wherein the acrylic is continuously introduced and polymerized onto a thermoplastic substrate which is continuously advanced upon a conveyor belt. In the continuous technique herein described, the acrylic "syrup" is deposited and polymerized upon the substrate, which is located on a moving, heated stainless steel belt.

Once the composition contacts the thermoplastic substrate, it must undergo a curing treatment to polymerize the acrylic monomer in a manner which allows it to penetrate into the surface of the substrate. The curing step is preferably carried out in several stages, prior to forming the finished product. When the mold is used, the preferred method of curing takes place in an oven of a type well known in the art at an initial temperature of from about 25°–70° C. for a period of about 3–18 hours and preferably at from about 50°–65° C. for about 4–7 hours. The temperature is then raised to about 75°–90° C., for 1–3 hours and then raised once again to an upper limit of about 100°–115° C. for a final 1–3 hour period. The most preferred curing parameters are 55°–60° C. for 4½ to 6 hours, then 80° C. for 2 hours and finally, 105° C. for 2 additional hours. Of course, the curing temperatures and times are variable, depending upon the thickness of the laminate and the amount and type of free radical initiator chosen to catalyze the reaction.

During the casting process, the acrylic monomer diffuses into the thermoplastic matrix to a depth sufficient to prevent debonding of the composite material during further processing operations a during use. This depth can range from about between about 0.001–0.1 inch, more preferably from 0.002–0.06 inch, and most preferably from about 0.005–0.02 inch. Also, upon completion of the polymerization reaction, there is no sharp delineation between where the acrylic layer ends and the plastic layer begins. Instead, a gradual change in cross section of the laminate structure is obtained, i.e., from all acrylic, through a blend of acrylic with the plastic substrate to all plastic on the other side of the laminate.

The depth of penetration of the acrylic into the thermoplastic substrate is directly controlled by the rate of the polymerization reaction, which may be adjusted in a number of ways, i.e., by varying the amount of initiator or by adjusting the duration and temperature at which the curing step is carried out. The longer the syrup remains in the liquid state, the deeper the penetration of the acrylic monomer into the substrate and the greater the resulting acrylic/thermoplastic interphase. Therefore, the penetration can achieve a depth of approximately 0.001–0.1 inch prior to completion of the polymerization reaction.

This depth of penetration forms an interphase which prevents the debonding of the layers. The resultant laminate actually enjoys improved weatherability and its surface can be produced having a high gloss with a large number of brilliant colors. The thermoplastic substrate may be brightly colored by the inclusion of pigments therein prior to the casting of a clear acrylic composition thereon. The upper surface of the substrate i.e., the surface upon which the acrylic composition is to be cast, can include metallic or heavy pigments or decorative patterns thereon prior to the application of the acrylic composition. Alternatively, the acrylic composition can include pigments to impart a desired color to the laminate. A large number of previously difficult to obtain surface effects, such as the use of metallic pigments or the treatment of the plastic substrate to provide a marbleized appearance which is enhanced by the glossy, transparent acrylic layer, may also be obtained with the present invention. Additionally, as noted above, the composites produced by the present method, especially those wherein the polymer is cross-linked, possess excellent surface characteristics relating to both chemical resistance and the hardness of the acrylic layer.

A further advantage of these composites is that they do not delaminate when subjected to additional manufacturing operations, such as cutting, machining and thermoforming, during handling or when put into use. Their ability to resist subsequent theremoforming operations is quite surprising, since some prior art laminates are often not able to be deeply drawn without cracking. Thus composites of the invention can be thermoformed into a wide variety of shapes useful in many different applications.

These shapes such as sinks, bathtubs, furniture and appliance or automobile body parts having a great deal of structural strength. These items may not require subsequent rigidizing with fiberglass reinforced resins and/or foam systems. A preferred thermoforming process comprises clamping the edges of the composite sheet while heating it to a temperature on the order of 135°–200° C.. The softened sheet is stretched over a female mold member having the shape to be imparted and it is thereafter sucked against the inner walls of the mold by means of a vacuum device attached to the outer surface thereof. Upon cooling, the formed product contracts to a sufficient degree to release it from the mold member. Other known thermoforming techniques can also be used, if desired, and one skilled in the art would be able to select the most suitable processing techniques for the specific articles to be manufactured.

EXAMPLES

The following are several illustrative examples of applicants' novel method for producing formable composite laminates. They are set forth for the purpose of illustration only, however, and should not be construed as limiting the invention in any manner.

EXAMPLE 1

100 gm of a syrup of 90% methyl methacrylate monomer and 10% polymethyl methacrylate is mixed with 0.15% di(sec-butyl) peroxy-dicarbonate, .0.05% dodecylmercaptan and 0.15% benzoyl peroxide. After de-aereation, the mixture is used to fill a mold having a base of a 6×6×.375" glass plate, and a top of rigid PVC plate, approximately 6×6×.300" thick, the plates being separated by a resilient gasket material approximately ⅛" thick around the perimeter. The mold is placed in a forced-air circulating oven at 55° C. for 16 hours, then the temperature is raised to 80° C. for 2 hours and then 105° C. for 2 hours. After cooling, a composite sheet of a cell cast acrylic layer chemically fused to the PVC layer is obtained. Using techniques well known to those of ordinary skill in the art, the composite sheet can be thermoformed, sawed, machined or cemented without delamination.

EXAMPLE 2

A mixture containing 99 gm of casting syrup (90% methyl methacrylate monomer and 10% polymer), 1 gm ethylene glycol dimethacrylate, 0.5 gm dodecyl mercaptan and 0.5 gm benzoyl peroxide is used to fill a mold constructed as in Example 1. The casting is allowed to cure in the oven initially at between 55 and 60° C. for 16 hours, then at 80° C. for 2 hours, then at 105° C. for another 2 hours. After cooling, a composite material having one surface of a cross-linked cell cast acrylic and the other of PVC is obtained which, again, can resist subsequent manufacturing operations without delamination which also provide the previously described advantages.

EXAMPLE 3

100 gm of the casting syrup is mixed with 0.5 gm di(sec-butyl)peroxy-dicarbonate, 0.5 gm benzoyl peroxide and 0.2 gm dodecyl mercaptan. After deaereation, the mixture is used to fill a mold such as in Example 1, except that the gasket is about 0.08" thick, and the thermoplastic sheet is a 0.250" thick coextruded laminate of PVC and ABS. The acrylic is cast on the PVC surface of the laminate. The casting is cured at 50°–55° C. for 16 hours, then 80° C. for 2 hours then 105° C. for 2 hours. The resulting composite, having a cell cast acrylic layer over the PVC/ABS laminate, results in a more easily thermoformed product which also provides the previously described advantages.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

We claim:

1. A process for producing a laminate which comprises:
   preparing an acrylic composition comprising an acrylic monomer and at least one free radical reaction initiating catalyst;
   casting said acrylic composition upon at least a portion of one surface of at least one thermoplastic material; and
   curing said cast acrylic composition in multiple stages at a sufficient temperature and for a sufficient time in each stage such that a major portion of said acrylic monomer is polymerized in a first stage and the remaining unpolymerized acrylic monomer is cured in a final stage so as to permit partial penetration of said acrylic monomer into said thermoplastic material to form a multilayer, formable laminate having a controllable gradient of polymerized acrylic monomer therethrough and increased resistance to debonding during subsequent handling, forming, or other manufacturing operations.

2. A process for producing a laminate which comprises:
   preparing an acrylic composition comprising an acrylic monomer and at least one free radical reaction initiating catalyst;
   casting said acrylic composition upon at least a portion of one surface of at least one thermoplastic material; and
   curing said cast acrylic composition at a sufficient temperature and for a sufficient time in three stages, said stages comprising a first stage in which from about 50–80% of said acrylic monomer is polymerized; a second stage in which from about 10–30% of said monomer is polymerized; and a third stage in which substantially all of any remaining monomer is polymerized so as to permit partial penetration of said acrylic monomer into said thermoplastic material to form a multilayer, formable laminate having increased resistance to debonding during subsequent handling, forming, or other manufacturing operations.

3. The process of claim 2 wherein said first stage is carried out at a temperature of between about 25°–70° C. for about 3–18 hours, said second stage is carried out at a temperature of between about 75°–90° C. for about 1–3 hours and said third stage is carried out at a temperature of between about 100°–110° C. for about 1–3 hours.

4. The process of claim 1 which further comprises controlling the depth of penetration of said acrylic composition into said thermoplastic material by varying the temperature and/or the time of said first curing stage.

5. The process of claim 1 which further comprises adding at least one of a chain length regulating agent or a cross-linking agent to said acrylic composition prior to the casting step.

6. The process of claim 5 which further comprises selecting said crosslinking agent from among ethylene glycol dimethacrylate, allyl methacrylate, polyethylene glycol dimethacrylate, and methacrylamide, so as to increase the solvent resistance of said cast acrylic composition.

7. The process of claim 1 wherein said casting step comprises cell casting said acrylic composition upon at least one sheet of said thermoplastic material.

8. The process of claim 1 wherein said casting step comprises continuously casting said acrylic composition upon a continuously advanced sheet or laminate of said thermoplastic material.

9. The process of claim 1, which further comprises selecting said thermoplastic material from ABS, SAN, polyvinyl chloride, an acrylic-based thermoplastic composition, a polycarbonate ABS/nylon alloy or laminates of two or more sheets of said thermoplastic materials.

10. The process of claim 1 which further comprises extruding or calendering two or more sheets of compatible thermoplastic materials prior to casting said acrylic composition thereupon.

11. The process of claim 1 which further comprises deaerating said acrylic composition prior to said casting step.

12. The process of claim 1 which further comprises thermoforming said laminate into an article of a desired shape without causing cracking or delamination thereof.

13. The process of claim 1 wherein two or more of said catalysts are added to said acrylic composition prior to casting thereof.

14. A process for forming a multilayered, formable laminate which comprises:
   preparing an acrylic composition comprising an acrylic monomer and at least one reaction initiating catalyst;
   deaerating said acrylic composition;
   casting said acrylic composition upon a surface of a thermoplastic material;
   curing said cast acrylic composition upon said thermoplastic material in three successive stages wherein a first stage is carried out at a temperature of between about 50°–65° C. for about 4–7 hours so as to polymerize from about 50–80% of said monomer; a second stage is carried out at a temperature of between about 75°–90° C. for about 1–3 hours so as to polymerize from about 10–30% of said monomer and a third stage is carried out at a temperature of between about 100°–110° C. for about 1–3 hours so as to polymerize any remaining monomer, permitting a penetration of said acrylic composition into said thermoplastic to a depth of between about 0.001–0.100 inch so as to produce a laminate having 15. The process of claim 14 wherein said casting step comprises cell casting said acrylic composition upon at least one sheet of said thermoplastic material.

16. The process of claim 14 wherein said casting step comprises continuously casting said acrylic composition upon a continuously advanced sheet or laminate of said thermoplastic material.

17. The process of claim 14 which further comprises forming said laminate into an article of a desired shape.

18. The process of claim 17 wherein, said laminate is formed into said shape by placing said laminate adjacent vacuum mold means; subjecting said laminate to an elevated temperature in the range of from about 135°–200° C. so as to conform the shape of said laminate to the shape of said mold means; cooling said molded laminate; and removing said laminate from said vacuum mold means as a shaped article.

19. The process of claim 17 wherein said laminate is molded in the form of a sink, a bathtub, an item of furniture, a boat hull, an appliance body part or an automobile body part having sufficient structural strength to prevent separation or delamination as a result of environmental and/or mechanical abuse.

20. The process of claim 19 which further comprises adding metallic or heavy pigments to said thermoplastic material to produce a laminate comprising a layer of clear acrylic over a brightly colored thermoplastic substrate.

21. The process of claim 14 which further comprises applying a pigmented material to at least a portion of an upper surface of said thermoplastic prior to casting said acrylic composition thereupon so as to produce a laminate comprising a layer of a clear acrylic over a thermoplastic substrate having decorative patterns upon at least a portion of an upper surface thereof.

22. The process of claim 14 which further comprises controlling an amount of resin within said thermoplastic material so as to produce a laminate having flame retardant properties.

23. A process for producing a laminate which comprises:
preparing an acrylic composition comprising an acrylic monomer and at least one free radical reaction initiating catalyst;
casting said acrylic composition upon at least a portion of one surface of at least one thermoplastic material;
curing said cast acrylic composition in multiple stages at a sufficient temperature and for a sufficient time in each stage such that a major portion of said acrylic monomer is polymerized in a first stage and the remaining unpolymerized acrylic monomer is cured in a final stage so as to permit partial penetration of said acrylic monomer into said thermoplastic material to form a multilayer, formable laminate having a controlled gradient of polymerized acrylic monomer therethrough and increased resistance to debonding during subsequent handling, forming, or other manufacturing operations; and
thermoforming said laminate under vacuum and elevated temperature conditions to form a desired shape without causing cracking or delamination thereof.

24. The process of claim 23 wherein the acrylic composition includes a mixture of predominantly an acrylic monomer and a substantially lesser amount of a second acrylic component.

25. The process of claim 23 wherein said acrylic monomer is methyl methacrylate.

26. The process of claim 1 wherein said acrylic composition includes an acrylic polymer in a lesser amount than said acrylic monomer.

27. The process of claim 2 wherein said acrylic composition includes an acrylic polymer in a lesser amount than said acrylic monomer.

28. The process of claim 14 wherein said acrylic composition includes an acrylic polymer in a lesser amount than said acrylic monomer.

29. The process of claim 14 wherein said acrylic composition includes pigments so as to impart a desired color to the laminate.

30. The process of claim 14 wherein said acrylic composition includes two free radical reaction initiating catalysts, one being operative at relatively lower temperatures and the other being operative at relatively higher temperatures.

31. The process of claim 25 wherein said thermoforming step includes placing the laminate into a vacuum mold, subjecting the laminate to a temperature of between about 135°–200° C. under vacuum so as to conform the laminate to the shape of the mold, and recovering the laminate as a shaped article.

* * * * *